(12) United States Patent
Peplinski

(10) Patent No.: US 8,931,955 B2
(45) Date of Patent: Jan. 13, 2015

(54) FOOD PACKAGING SHEET FOR USE IN MICROWAVE OVENS

(75) Inventor: Mark Peplinski, Whitchurch (GB)

(73) Assignee: Excelsior Technologies Limited, Flintshire (GB)

( * ) Notice: Subject to any disclaimer, the term of this patent is extended or adjusted under 35 U.S.C. 154(b) by 294 days.

(21) Appl. No.: 13/061,704

(22) PCT Filed: Sep. 1, 2009

(86) PCT No.: PCT/GB2009/002105
§ 371 (c)(1), (2), (4) Date: Jun. 24, 2011

(87) PCT Pub. No.: WO2010/026369
PCT Pub. Date: Mar. 11, 2010

(65) Prior Publication Data
US 2011/0248036 A1    Oct. 13, 2011

(30) Foreign Application Priority Data
Sep. 2, 2008 (GB) .................................. 0815930.3

(51) Int. Cl.
| | |
|---|---|
| B65D 33/01 | (2006.01) |
| B65D 30/08 | (2006.01) |
| B65D 81/34 | (2006.01) |
| B32B 7/02 | (2006.01) |
| B32B 27/08 | (2006.01) |
| B32B 27/32 | (2006.01) |
| B32B 27/34 | (2006.01) |
| B32B 27/36 | (2006.01) |

(52) U.S. Cl.
CPC ........... *B65D 81/3461* (2013.01); *B32B 7/02* (2013.01); *B32B 27/08* (2013.01); *B32B 27/32* (2013.01); *B32B 27/34* (2013.01); *B32B 27/36* (2013.01); *B32B 2250/24* (2013.01); *B32B 2307/514* (2013.01); *B32B 2439/06* (2013.01); *B32B 2439/40* (2013.01); *B32B 2439/70* (2013.01)
USPC ............................. 383/101; 383/103; 383/116

(58) Field of Classification Search
CPC ..................... B65D 2205/00; B65D 81/3461
USPC .......................................... 383/100–103, 116
See application file for complete search history.

(56) References Cited

U.S. PATENT DOCUMENTS 5,300,746 A    4/1994  Walters et al.
5,655,842 A *  8/1997  Hagino ........................ 383/101
(Continued)

FOREIGN PATENT DOCUMENTS

EP    0 661 219 A2    7/1995
EP    1122189 A1 *   8/2001    ............. B65D 81/34
(Continued)

OTHER PUBLICATIONS

Machine translation of Japanese Document No. 2002-80070. Translated on Jun. 30, 2010.*
(Continued)

*Primary Examiner* — Jes F Pascua
(74) *Attorney, Agent, or Firm* — Kilpatrick, Townsend & Stockton LLP

(57) ABSTRACT

A composite or laminate film or sheet of plastics material for use in microwave ovens comprises at least three layers of plastics material bonded and/or adhered together and with the central layer being of unoriented plastics material or of less oriented material relative to the orientation of the plastics material(s) of the outer layers, and/or being of lower melting point materials than the outer layers.

6 Claims, 5 Drawing Sheets

(56) References Cited

U.S. PATENT DOCUMENTS

| | | | |
|---|---|---|---|
| 5,839,832 A * | 11/1998 | Hagino | 383/101 |
| 6,054,698 A | 4/2000 | Mast | |
| 6,582,123 B1 * | 6/2003 | Tang | 383/100 |
| 6,596,355 B1 * | 7/2003 | Mita et al. | 428/35.2 |
| 2003/0022974 A1 | 1/2003 | Tai et al. | |
| 2005/0037186 A1 * | 2/2005 | Forte et al. | 428/220 |
| 2007/0228036 A1 | 10/2007 | Noyelle et al. | |
| 2009/0035424 A1 * | 2/2009 | Mita et al. | 426/113 |
| 2009/0257687 A1 * | 10/2009 | Mitchell | 383/103 |

FOREIGN PATENT DOCUMENTS

| | | | | |
|---|---|---|---|---|
| EP | 1 167 017 A1 | 1/2002 | | |
| EP | 1 477 306 A1 | 11/2004 | | |
| JP | 11165771 A * | 6/1999 | | B65D 81/34 |
| JP | 2000062859 A * | 2/2000 | | B65D 81/34 |
| JP | 2001180765 A * | 7/2001 | | B65D 81/34 |
| JP | 2002080070 A * | 3/2002 | | B65D 81/34 |
| JP | 2006-305754 A | 11/2006 | | |
| WO | WO 02/085619 A1 | 10/2002 | | |
| WO | 2007/021439 A2 | 2/2007 | | |

OTHER PUBLICATIONS

International Search Report from PCT/GB2009/002105, mailed Feb. 11, 2010 (4 pages).

Dictionary.com definitions of POUCH and BAG at http://dictionary.reference.com/browse/pouch?s=t, http://dictionary.reference.com/browse/bag, respectively.

International Search Report, Date of Mailing Feb. 4, 2010, PCT Application No. PCT/GB2009/002109, 5 pages.

* cited by examiner

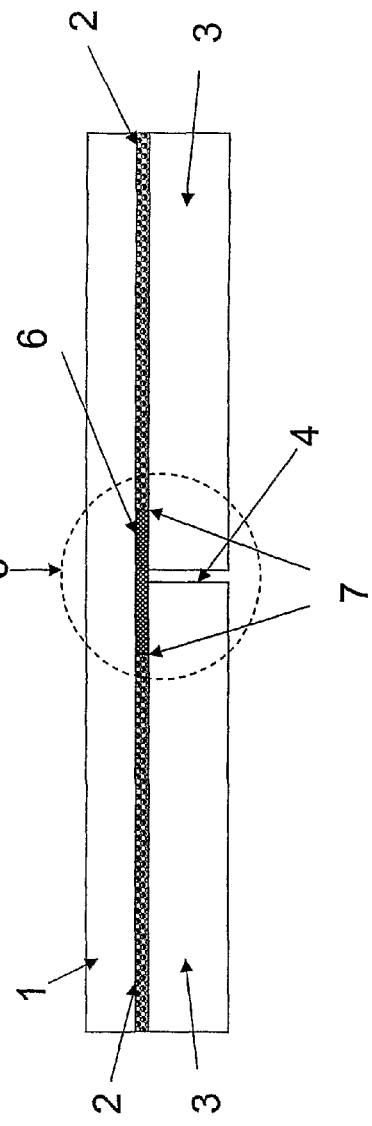
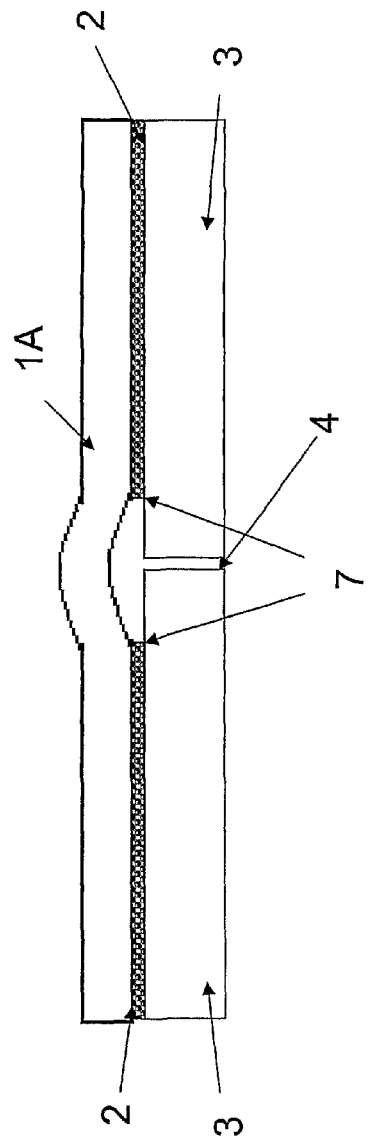

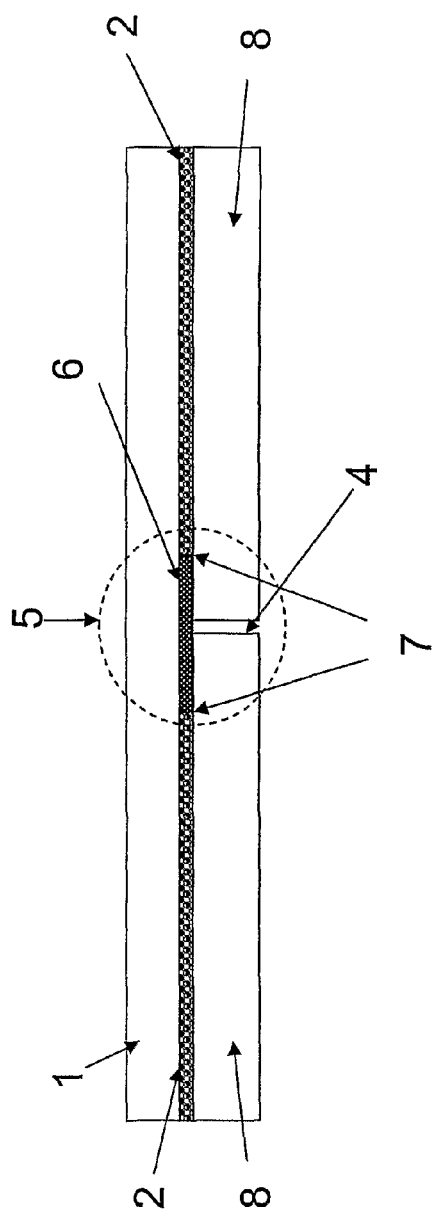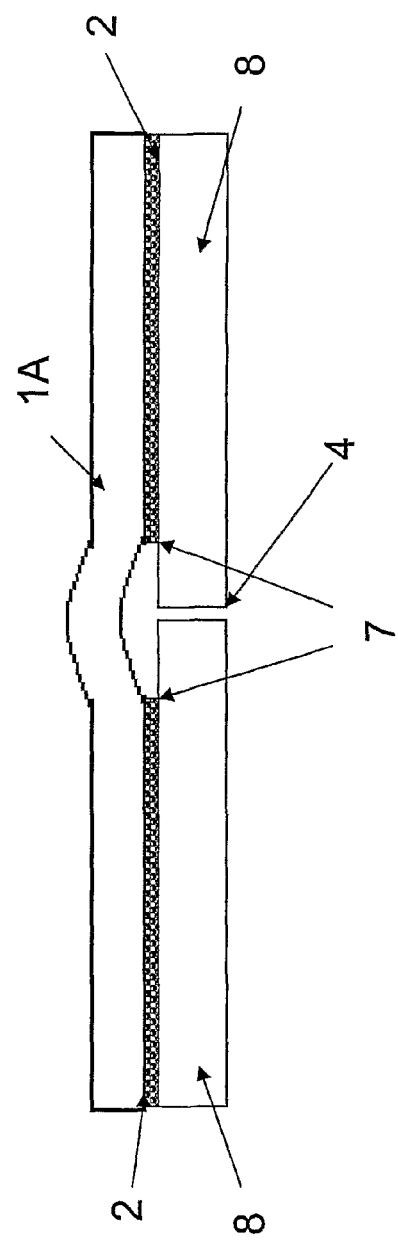

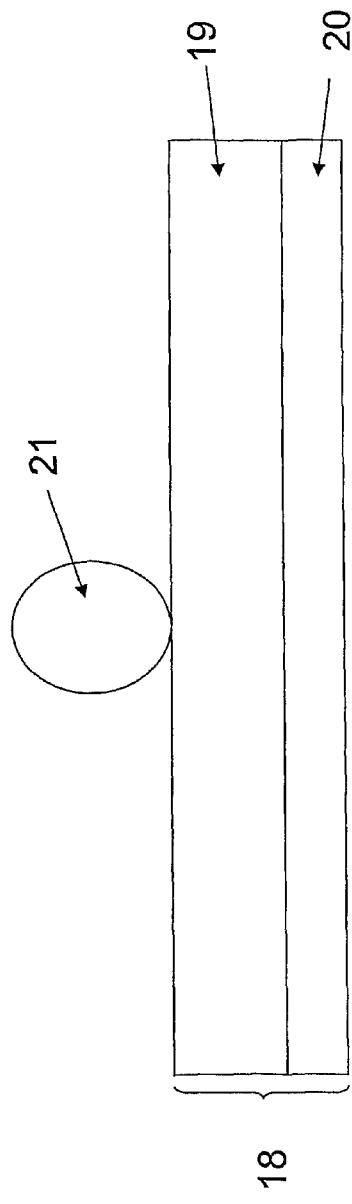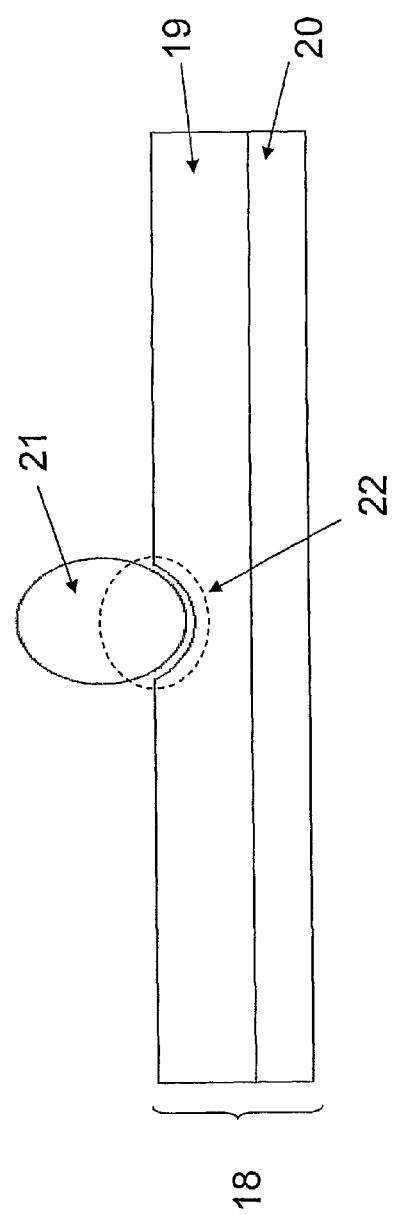

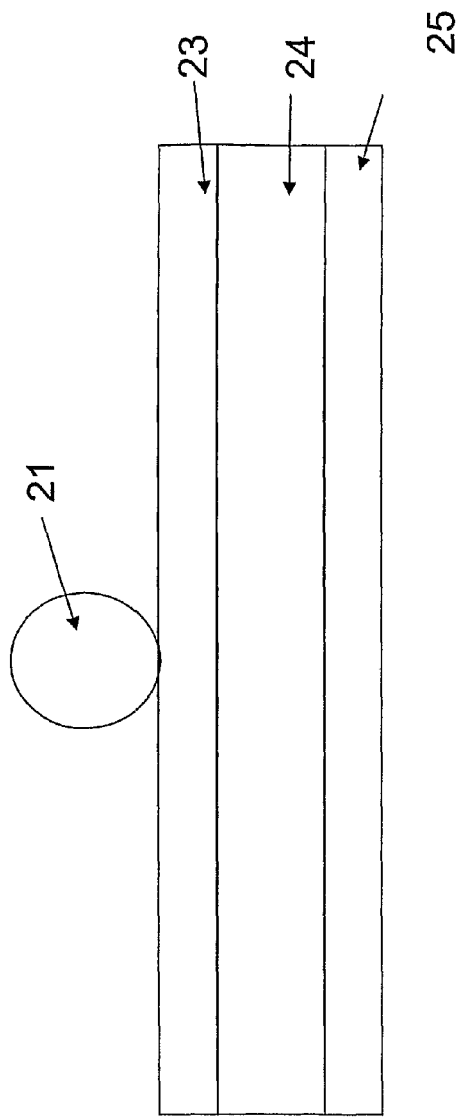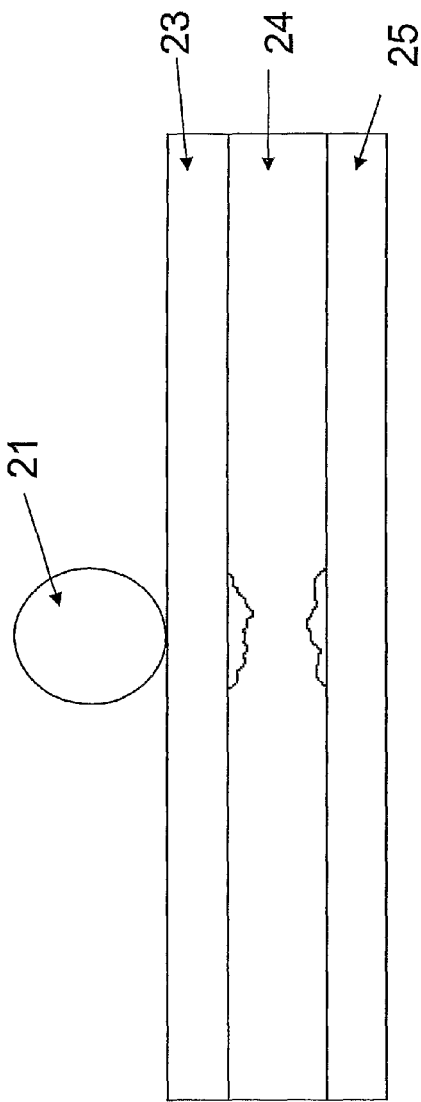

FOOD PACKAGING SHEET FOR USE IN MICROWAVE OVENS

The present invention relates to an improved and versatile packaging sheet material for use particularly (but not exclusively) in microwave ovens and such as may be used in any desired container be it with or without pressure relief valve means.

With increasingly powerful microwave ovens and ever more complex food products containing fats and oils together with salts, spices and sugars, which can cook at higher temperatures, it is sometimes found that packaging materials comprising a film of two layers bonded together, such as, a layer of Polyester (or Polypropylene, or Polyamide) bonded to a non-oriented polypropylene (or Polyethylene), which are used to contain the food stuff while it is being cooked, can distort, melt and even rupture, and so cause significant product leakage.

This occurs because hot spots can occur, particularly in a high powered microwave oven, when small spots of oil become over-heated, due to the action of the focused microwave energy, and may distort or melt the adjacent food contact layer, which is undesirable and in extreme circumstances may lead to bursts or holes and subsequent leakage.

These distortions are at least unsightly and if they are severe enough they can cause "food contact" concerns as they can melt through to the adhesive and or ink layers, which are invariably not designed for "direct" food contact.

In the worst case the film can melt all the way through the package and so cause leakage, which can also be dangerous due to the high temperature of the contents of the package.

The simplest solution is to make a structure which also has an oriented film (which has a higher heat resistance due to the orientation), as the heat sealable food contact layer.

However even a laminate of two oriented polyesters (which nominally has much improved temperature resistance) will still on occasion melt all the way through, and if a valve is incorporated in order to allow some pressure build up and the pressure to be maintained (such as disclosed in EP 0661 219) upon heating and during cooking, then this laminate will potentially rupture in the region of the seal or join or valve.

The present invention provides a composite film layer or sheet which overcomes such known problems.

In its broadest aspect, the present invention comprises a composite laminate film or sheet of plastics material for use in microwave ovens comprising at least three layers of plastics material bonded and/or adhered together and with the central layer being unoriented or less oriented relative to the outer layers and normally having a lower melting temperature, and preferably with the central layer being of un-oriented polypropylene or polyethylene, and the outer layers being of oriented materials, e.g. preferably polyester (or polypropylene, or polyamide).

More specifically according to the present invention a composite laminate plastics film for use in, envelopes, pouches or other containers for cooking food in microwave ovens, comprises a composite plastics material laminate of adhered and/or bonded together plastics material layers comprising two outer layers of oriented material (such as polyester or polypropylene or polyamide) and a middle or inner layer of material (such as polypropylene, polyethylene, or polyamide) which is unoriented or less oriented relative to the outer oriented materials, normally has a lower melting point relative to the outer layer materials, and which may be formed by being "blown" or "cast".

Thus, more simply, in one aspect of the invention, a composite plastics laminate film for use in microwave ovens or a container incorporating such a film for cooking food in microwave ovens, comprising three layers namely a first layer of oriented plastics material (such as polyester, polypropylene, or polyamide), a second and middle layer formed of less oriented material than the first layer (and having a lower melting point) (such as being formed by cast or blown polypropylene, or polyethylene, or polyamide), and a third layer formed of oriented (or more oriented) plastics than the second layer (said third layer being formed of similar material to the first layer—but not necessarily the same), and said layers being adhered and/or bonded together e.g. by the inclusion of adhesive layers there between.

The composite laminate plastics material may have a pressure relief valve means (such as described in EP 0661 219) incorporated therein including an area between two of the three sheets which is free from adhesive bonding material and a slit is formed on the sheets or sheets which are closest to the interior of the container for the foodstuff so as to define a space through which pressure and steam may escape.

Polyethylene, which is very widely used for packaging of frozen foodstuffs, has the disadvantage of easily melting in parts (because of its relatively low melting point) especially upon initial heating of a frozen foodstuff wherein small spots of oil (if present) are preferentially heated in the microwave, which can cause local hot spots. This can give rise to film deformation or to holes being formed. This can also happen if the polyethylene is the food contact surface of a two layer laminate with oriented polypropylene (or polyester) as the outer material.

It has unexpectedly been found that if a composite laminate film is used in containers for food for microwave cooking, which is formed of three layers, with the outer layers being of oriented plastics material, such as oriented polyester or oriented polyamide or oriented polypropylene, and a central layer of relatively unoriented (relative to the outer layers) plastics material, such as polypropylene or polyethylene or polyamide, such as by being formed by being blown or cast, and has a lower melting point than the outer layers, unexpectedly prevents the distortion of the food contact surface layer and in worse cases avoids formation of leaks from holes caused by the local hot spots that can be otherwise generated in microwave cooking, especially with any oils present.

It has also unexpectedly been found that when a pressure-relief valve mechanism is incorporated in the laminate described above, (such as described in EP 0661 219), which allows for the build-up and maintenance of pressure while the food is being cooked, then the laminate construction allows the valve to work as it should and for it not to fail nor for layers to rupture under this increased pressure, as might otherwise happen if the laminate was made of two oriented films laminated together, without the unoriented film in between the two.

A triple layer laminate film according to the invention enables cooking at higher temperatures in the microwave and it enables for a pressure build-up and maintenance and for a relief mechanism to be included in the package, if required, due to the improved toughness and flexibility the unoriented layer in the centre of the film provides. This pressure build-up and maintenance is desired in order to improve cook time, cook quality, vitamin retention, moisture retention, etc.

In another application it may be desired to seal a film or sheet to different tray materials e.g Crystalline Polyester (CPET), for cooking at higher temperatures. CPET trays are used to withstand high temperatures associated with conventional ovens and for products which may contain very high fat (oil) content, and salts and sugars, which will reach very high temperatures. Thus for example, the laminate according to the invention which may comprise a polyester or polyamide more oriented outer layer and a less oriented middle layer which may be a polypropylene or polyethylene, and an inner sealing layer being more oriented polyester layer which is sealable to the surface of the CPET container. For this end use the tray material will have been chosen to give maximum temperature resistance, and without using the structure described above, then it would not be possible to achieve any pressure build up, and to maintain this pressure build up for the many cooking benefits listed above.

The invention will be described further, by way of example, with reference to the accompanying schematic drawings, in which:

FIGS. 1 and 1a are schematic sections through a known laminate film in the region of a pressure relief valve means and comprises two dissimilar layers of plastics material as used in microwave ovens with FIG. 1 illustrating the condition prior to cooking and FIG. 1a the condition once cooking has commenced;

FIGS. 2 and 2a are schematic sections through a known laminate film and comprises two layers of similar plastics material (oriented polyester) as a potential solution to the problem of the laminate in FIG. 1 having insufficient temperature resistance. Illustrated are the points of maximum stress that would be generated in the region of the pressure relief valve means if this structure was used as part of a microwave cooking pouch with FIG. 2a being the condition as occurs during cooking;

FIGS. 5 and 5a are schematic sections through known two layer laminates illustrating the so-called "hot spot" effect; and FIGS. 6 and 6a are schematic sections through a three layer film according to the invention wherein the "hot spot" effect is overcome or minimized.

Figure 3:
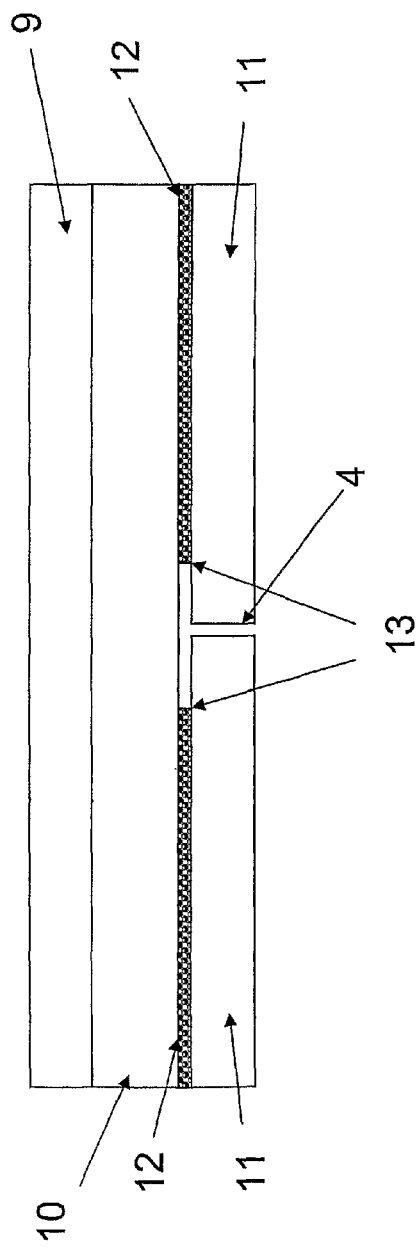
FIG. 3 is a schematic section similar to FIG. 1 through part of a film showing a composite three layer plastic laminate film according to one embodiment of the invention with a valve being directly above the innermost layer.

In FIG. 1, as is known, a layer 1 of oriented polyester is bonded or adhered by adhesive layer 2 to a layer of unoriented polypropylene 3. A slit 4 is provided in the lower layer 3 as part of a pressure release valve 5 which includes a partially sealable and pressure expellable strip 6 (such as of a lacquer) at the ends and over the slit 4 and which relieves pressure during use (see EP0661219). Layer 1 is bonded to layer 3 but the edges of the bonding lie at points 7. When pressure (steam) is generated inside the pack, then a passage is provided by slit 4 which then allows the steam to soften layer 6 (not shown in all subsequent Figs but to be assumed if required) which in turn releases and allows the steam to escape to the exterior through channel 5 which is acting as a pressure release valve. This causes the "bulge" seen in layer 1A in FIG. 1a and puts pressure at the adhesive bonding line, point 7.

FIG. 2 is a view similar to FIG. 1 except that the materials differ in the lower layer 8 is also oriented polyester which has a heat-sealable layer included and is bonded to PET layer 1 by adhesive 2 which terminates along edge lines 7 instead of CPP layer 3.

When pressure builds-up inside the pouch (the interior of which lies beneath layer 8), the pressure acting through slit 4 exists between layers 8 and 1 and the "bulge" occurs in FIG. 2a and the pressure works on point 7. This pressure when applied to an oriented film can often rupture the pack at point 7.

FIG. 3 is a sectional view similar to the previous figures, of a composite laminate film or sheet according to the invention and comprising three layers 9, 10 and 11 bonded together, such as by adhesive—only adhesive layer 12 between the two layers 10, 11 being illustrated. Layer 9 is of oriented polyester, layer 10 is of unoriented polypropylene or polyethylene or such being less oriented and of lower melting point than layer 9. Layer 11 is also of oriented polyester similar to layer 9 but will generally have a heat-sealable coating (typically an amorphous polyester) on the surface which is facing towards the inner space of the pack. Other materials may be use but the important consideration is that the middle or inner layer 10 is less oriented than the outer layers 9 and 11. It has unexpectedly been found out that the tendency for either the inner layer 11 or the outer layer 9 of PET to rupture or split at point 13 under pressure is reduced.

Figure 4:
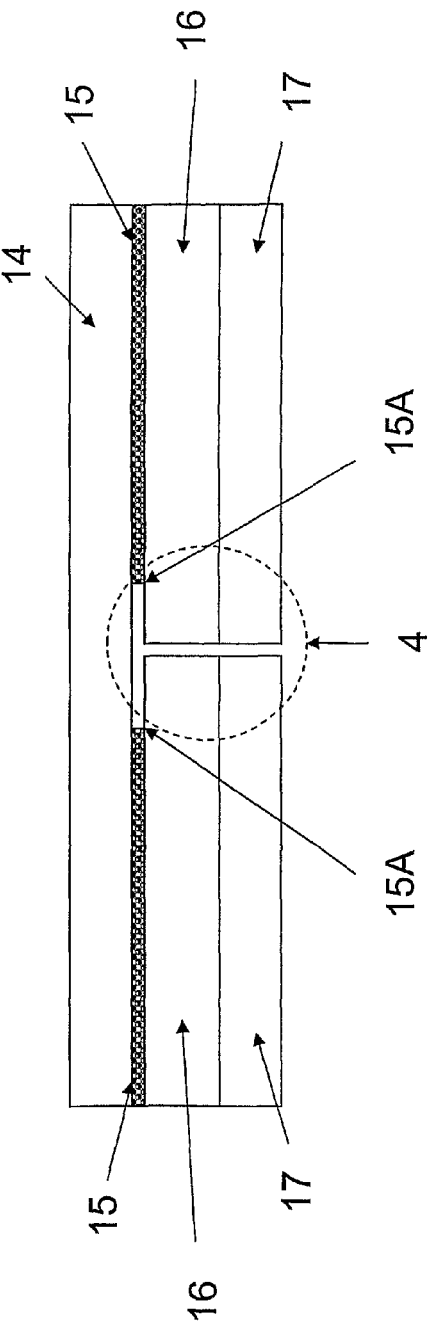
FIG. 4 is a schematic section similar to FIG. 3 but illustrating an alternative position of the pressure relief valve means between the middle and outermost layers and slits leading thereto.

In FIG. 4, which is similar to FIG. 3, different possible considerations and materials are schematically illustrated, by way of example. Thus a composite laminate film or sheet 1, comprises an upper film layer 14 of oriented polyester (which may be similar to layer 1 in FIG. 1 or layer 9 in FIG. 3) which is to form the inner layer and which is bonded by adhesive 15 to a middle layer 16 of unoriented or relatively less oriented plastics material, such as polypropylene, which in turn, is bonded on its opposite side (adhesive not shown) to outer layer 17, which is of more oriented material than layer 16 and may, for example, be of oriented polyester or polyamide. In this combination, the slit 4 is through both the lower layer 16 and the middle layer 15 in contrast to FIG. 3 wherein it is only through one, lower layer 11.

Here also the adhesive 15 terminates along the lines 15A in part defining the pressure/steam escape passage and this structure will work similarly to that in FIG. 3 in reducing and avoiding bursting/rupturing.

FIG. 5 schematically illustrates a known laminate 18, comprising a combination of two plastics material layers bonded together with adhesive (not shown) and here the materials are unoriented polyethylene for layer 19 and polyester for layer 20. There is illustrated a mass or drop of oil 21 (or a mass or drop of a sauce containing a high percentage of oil/fat) which upon initial heating (especially in a microwave oven) creates a hot spot which may cause melting in layer or film 19 as indicated by depression 22 in FIG. 5a and which may extend even further and eventually give rise to the undesirable formation of a hole.

In FIG. 6 there is schematically illustrated use of a composite plastic laminate according to the invention, which is generally the same laminate structure as in FIG. 3 and FIG. 4 but differs in that it does not depict the area near the pressure relief valve and comprises an upper layer 23 of oriented polyester (which is similar to layers 11 and 17) and above which the hot interior of the cooking container is defined in this case. Beneath layer 23 is a middle layer 24 of unoriented material (also having a lower melting point) relative to the outer layers (which is similar to layers 10 and 16), and which, in the example, is unoriented polypropylene. Beneath this middle layer is another oriented layer 25 of oriented polyester—similar to layers 9 and 14.

It has been unexpectedly discovered that the combination according to the invention prevents or minimises the hitherto disadvantageous effects of hotspots created by drops of oil 21 or other foodstuffs, as it appears the middle unoriented layer (with a lower melting point) softens and melts preferentially before the outer layer is able to melt or soften as shown in FIG.

6a. Layer 24 is affected by possibly distorting but the outer food contact layer 23 remains intact and as such does not create the problems illustrated in FIG. 5a.

The invention claimed is:

1. A microwaveable envelope, pouch or other cooking container having pressure relief valve means incorporated therein, said container including a composite or laminate film or sheet of plastics material comprising three sheet layers bonded and/or adhered together and in which two outer sheet layers are of oriented plastics material and a middle or inner sheet layer is of unoriented or less oriented plastics material relative to the material of the outer layers such that the middle or inner layer has a lower melting point than the outer layers; and wherein the pressure relief valve means comprises an area between an outer layer and the middle or inner layer which is free from adhesive or bonding, and a slit formed on the layer or layers closest to the interior of the container so as to define with said area a space through which steam may escape to relieve pressure or excess pressure within the container.

2. A container as claimed in claim 1, in which the oriented outer sheet layers are selected from polyester or polypropylene or polyamide and the unoriented or less oriented middle or inner sheet layer is selected from polypropylene, polyethylene or polyamide.

3. A container as claimed in claim 1, in which the slit extends through two sheets.

4. An envelope, pouch or other container for use in cooking food in microwave ovens, said container including a composite or laminate film or sheet of plastics material comprising at least three sheet layers bonded and/or adhered together;

said container further incorporating a pressure relief valve means which includes an area between two of the three sheet layers which is free from adhesive or bonding, and a slit formed on the sheet layer or layers which are closest to the interior of the container so as to define with said area a space through which steam may escape to relieve pressure or excess pressure; and characterized in that the at least three sheet layers bonded and/or adhered together comprise two outer sheet layers of oriented plastics material and a middle or inner sheet layer of unoriented or less oriented plastics material relative to the material of the outer layers such that the middle or inner layer has a lower melting point than the outer layers.

5. A container as claimed in claim 4, in which the oriented outer sheet layers are selected from polyester, polypropylene or polyamide and the unoriented or less oriented middle or inner layer is selected from polypropylene, polyethylene or polyamide.

6. A container as claimed in claim 4, in which the slit extends through two sheet layers.

* * * * *